United States Patent [19]

Heidel et al.

[11] Patent Number: 4,741,916
[45] Date of Patent: May 3, 1988

[54] METHOD OF AND APPARATUS FOR PRODUCING INDIVIDUAL DOUGH PIECES OF SUBSTANTIALLY CONSTANT SIZE AND SHAPE

[75] Inventors: Daniel J. Heidel, Cincinnati; Corey J. Kenneally, Maineville, both of Ohio

[73] Assignee: The Procter & Gamble Company, Cincinnati, Ohio

[21] Appl. No.: 90,805

[22] Filed: Aug. 28, 1987

[51] Int. Cl.⁴ .................. A21C 5/00; A21C 11/10; A23P 1/12
[52] U.S. Cl. .................. 426/549; 99/450.2; 425/296; 425/298; 425/308; 426/94; 426/503; 426/516
[58] Field of Search ............ 426/496, 502, 503, 283, 426/94, 516, 518, 549; 99/450.2, 450.6, 450.7; 425/296, 297, 298, 308, 312, 313

[56] References Cited

U.S. PATENT DOCUMENTS

| | | | |
|---|---|---|---|
| 1,144,953 | 6/1915 | Ward | 425/296 |
| 1,399,873 | 12/1921 | Powell | 425/299 |
| 1,630,436 | 5/1927 | King | 425/302.1 |
| 2,666,947 | 1/1954 | Shaw | 425/306 |
| 3,521,323 | 7/1970 | Hesch | 425/305.1 |
| 3,557,682 | 1/1971 | Goosman | 99/327 |
| 4,045,151 | 8/1977 | Zazzara | 425/297 |
| 4,253,815 | 3/1981 | Beckers et al. | 425/235 |
| 4,526,525 | 7/1985 | Oiso et al. | 425/9 |
| 4,528,900 | 7/1985 | Simelunas | 99/450.7 |
| 4,534,726 | 8/1985 | Simelunas | 425/363 |
| 4,573,899 | 3/1986 | Wiemann et al. | 425/145 |
| 4,578,027 | 3/1986 | Koppa et al. | 425/298 |
| 4,608,918 | 9/1986 | Funabashi et al. | 99/450.4 |
| 4,643,084 | 2/1987 | Gomez | 99/352 |
| 4,643,904 | 2/1987 | Brewer et al. | 426/549 |
| 4,647,468 | 3/1987 | Pinto | 426/503 |
| 4,689,236 | 8/1987 | Pinto | 426/502 |
| 4,696,823 | 9/1987 | DeChristopher | 426/496 |
| 4,702,926 | 10/1987 | Fowler | 426/283 |

Primary Examiner—George Yeung
Attorney, Agent, or Firm—John J. Ryberg; E. Kelly Linman; John V. Gorman

[57] ABSTRACT

A method of and apparatus for making individual dough pieces that are of substantially constant size and shape. The method includes the steps of forming a continuous dough rope and laying it on a horizontally-moving conveyor belt. The rope then passes between a pair of horizontally-reciprocating cutting elements which, when closed, cut a dough piece form the rope's end portion. The closed pair of cutting elements also forms a mold having an open top. While the dough piece is momentarily within the mold, a tamping plate is brought vertically downward into contact with the piece, thereby giving it a preselected size and shape. In another particularly preferred embodiment, a channel is formed in the continuous rope's top surface that is subsequently filled with discrete morsels. When the tamping plate is brought into contact with the dough piece, the plate presses the morsels firmly into the dough piece's outer surface.

Also disclosed are several embodiments of apparatus specifically adapted for carrying out the above-described method in a high-speed manufacturing environment.

20 Claims, 2 Drawing Sheets

METHOD OF AND APPARATUS FOR PRODUCING INDIVIDUAL DOUGH PIECES OF SUBSTANTIALLY CONSTANT SIZE AND SHAPE

TECHNICAL FIELD

The present invention relates to methods of and apparatus for making edible products, and more particularly relates to methods of and apparatus for cutting individual dough pieces of substantially constant size and shape from a large mass of dough. The present invention further relates to methods of and apparatus for pressing discrete morsels firmly into individual dough pieces.

BACKGROUND OF THE INVENTION

In making individual edible products by starting with a large mass of dough, one basic objective is to generate a minimum amount of waste or scrap. If the dough pieces are to be generally square or rectangular, it is known that cutting or slicing a continuous dough sheet into pieces does produce satisfactory results. However, if the dough pieces are to be generally circular or oval as in the case of making most ready-to-serve cookies, it has been found that the cutting dies typically used in a sheet/cut method produce an unacceptable amount of scrap. In addition, if the ready-to-serve cookies are of laminate construction having layers of dissimilar dough such as that disclosed in the revolutinary teachings of commonly-assigned U.S. Pat. No. 4,455,333 to Hong & Brabbs, which is incorporated herein by reference, any scrap resulting from the cutting operation is extremely difficult to separate into the individual components for subsequent recycling.

Another approach to making generally round individual dough pieces is to continuously extrude a rod-shaped dough rope onto an endless conveyor belt followed by cutting the rope into individual pieces. Various apparatus for cutting dough pieces from extruded ropes have been proposed; for example, those disclosed in U.S. Pat. Nos. 4,528,900; 4,534,726; 4,578,027; and 4,647,468. In each of these patents, various types of blunt cutting elements are reciprocated vertically down through the dough rope and into contact with the conveyor belt upon which the rope is carried. In addition to subjecting the conveyor belt and overall apparatus to significant impact loading and vibration caused by such motion, it has been found that these general types of cutting elements leave much to be desired because some portion of the dough rope is inevitably trapped between the cutting element and the conveyor belt, thereby generating waste that must be eventually scrapped away.

In making individual edible products from a large mass of dough, another basic objective is to form dough pieces that are of substantially constant size and shape. This objective is particularly important when a fixed number of products are to be subsequently packaged in a fixed-sized container, an example of which being a plastic tray having two or more rows of product overwrapped in a bag. If the individual products are not of substantially constant size and shape, a given number of products will not fit in the tray, which in an automated packaging operation will cause product breakage, package rejections, and perhaps significant downtime.

Some edible products made from a dough contain discrete morsels, an example being a chocolate chip cookie. As discussed in commonly-assigned U.S. Pat. No. 4,643,904 to Brewer et al., which is incorporated herein by reference, it has been found that consumers generally prefer morsel-containing edible products to exhibit a high degree of "morsel show" or "chip show," i.e., ones where the morsels are readily visible by casually inspecting the product's outer surface. As also discussed in Brewer, one known method of making edible products having highly-visible morsels is to sprinkle morsels onto the dough's outer surface such as is disclosed in U.S. Pat. No. 4,643,084 to Gomez. However, it has been found that this general type of system is unacceptable because depending on the tackiness of the product's outer surface, many of the morsels fall off the dough as evidenced by Gomez' need to include a morsel trap to recover dislodged morsels. In addition, if the dough pieces are subsequently baked, it has been found that in the case of chocolate chips, the chocolate melts or "bleeds" all over the cookie's outer surface, which gives the cookie an unsightly appearance.

In light of the above, a principal object of the present invention is to provide a high-speed method of and apparatus for cutting individual dough pieces from a larger mass of dough that are of substantially constant size and shape.

Another object of the present invention is to provide a method of and apparatus for cutting individual dough pieces from a mass of dough while generating a minimum amount of waste or scrap.

Yet another object of the present invention is to provide a method of and apparatus for tamping an individual dough piece having discrete morsels sprinkled thereon to press said morsels firmly into the piece's outer surface.

Another object of the present invention is to provide a method of and apparatus for cutting individual dough pieces from a laminated dough rope comprised of dissimilar layers of outer and inner doughs such that the outer dough substantially encapsulates the inner dough.

Another object of the present invention is to provide a method of and apparatus for forming individual dough pieces having highly-visible morsels.

These and other objects, advantages, and novel features of the present invention will become apparent to those skilled in the art from the following detailed description and appended claims.

SUMMARY OF THE INVENTION

As used in the following summary and detailed description of the present invention, the term "dough" is intended to include a wide variety of edible materials such as cookie dough, pastry dough, bread dough, confectionary, etc. The term "dough rope" or simply "rope" is intended to mean a continuous rod of such edible material formed by any one of various known techniques such as extruding, rolling, etc. In addition, the term "morsels" is intended to include a wide variety of discrete pieces of edible particulate material, examples of which include flavored chips, nutmeats, fruits, cereals, and candies.

The present invention provides a high-speed method of and apparatus for producing individual dough pieces from a larger mass of dough that are of substantially constant predetermined size and shape. The method begins by forming a continuous dough rope with for example an extruder, and subsequently laying the rope onto the top surface of an endless, horizontally-moving conveyor belt. The belt carries the rope to a cutting/tamping device that cuts a series of individual dough pieces from the rope's end as the rope advances. Thereafter, the conveyor belt carries the individual pieces away from the cutting device for further processing such as, for example, transferring the pieces to a higher speed conveyor to spread them out for baking in an oven. After baking, the individual pieces (now ready-to-serve cookies for example) are placed in suitable packaging for shipment to the trade.

The cutting/tamping portion of the present invention includes a pair of horizontally-moveable, matched cutting elements disposed on opposite sides of the dough rope when the cutting elements are in their open position. At predetermined intervals, the cutting elements are brought together which cuts a dough piece from the rope's end. While in this closed position, the cutting elements define a mold cavity having an open top. A tamping plate located directly above the closed cutting elements is then brought vertically downward such that it enters the mold's open top and comes into contact with the dough piece, thereby spreading the dough piece outwardly into contact with the mold cavity's inner surface and giving the piece a predetermined shape. When the pair of cutting elements and tamping plate are returned to their original positions, the dough piece is released and carried downstream for further processing such as baking.

In a particularly preferred embodiment of the present invention, the continuous dough rope is provided with a channel or groove running along its top surface. Before the rope is cut and tamped, discrete morsels are deposited into the channel followed by, if desired, partially covering the morsels with a strip or several strips of dough. When the rope is cut and tamped as described above, the tamping plate not only gives each cut dough piece a substantially constant, predetermined size and shape, but also presses the morsels firmly onto each dough piece's outer surface.

In practicing the above-described methods and apparatus in a high-speed manufacturing setting, the cutting-/tamping device preferably moves in the same direction and speed as the conveyor belt when the cutting elements and tamping plate are in contact with the dough rope, i.e., zero relative motion therebetween, to avoid tearing or otherwise damaging the rope. In addition, multiple rows of dough ropes are simultaneously cut and tamped by a corresponding number of cutting-/tamping devices arranged side-by-side or staggered across the width of the conveyor belt, i.e., in the cross-machine direction. For even higher production rates, cutting elements that simultaneously cut several dough pieces from a single dough rope for each cutting stroke can be used.

BRIEF DESCRIPTION OF THE DRAWINGS

While the specification concludes with claims that particularly point and distinctly claim the present invention, it is believed that the invention will be better understood by reading the following description with reference made to the following drawings in which:

DETAILED DESCRIPTION

In the following detailed description of the present invention, the frame, bearings, supports, cams, power sources and the like which must necessarily be provided with respect to the various elements of the disclosed apparatus are not shown in the figures or described in detail in order to more clearly depict and disclose the present invention, it being understood that these peripheral components are well within the knowledge of those skilled in the art of producing edible products and machine design.

Figure 1:
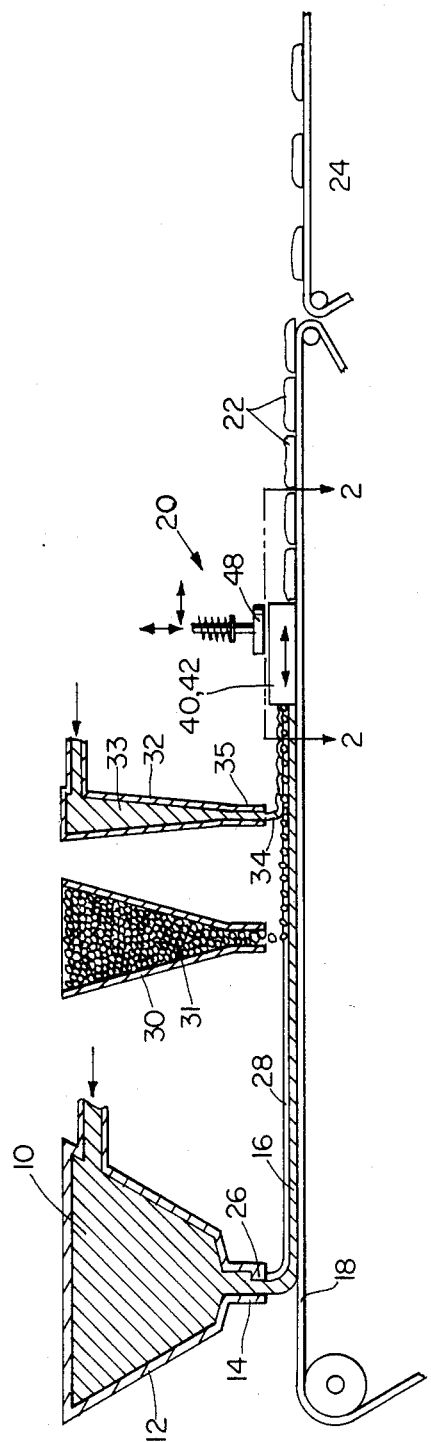
FIG. 1 is a side elevational view schematically illustrating the apparatus of the present invention with some components in cross-section.

FIG. 1 is a cross-sectional schematic view of the apparatus used in making individual dough pieces of substantially constant size and shape. In FIG. 1, dough 10 is fed into hopper 12 by variable pressure means (not shown) that is dependent on the dough's consistency, examples of which include an auger, positive displacement pump, or simple gravity feed. Dough 10 then passes through means 14 for forming a continuous rod-shaped rope of dough 16 (hereinafter "dough rope"), which is deposited onto the top surface of horizontally-moving, endless conveyor belt 18. Rope forming means 14 is preferably an extruder such as those available from Bepex-Hutt of West Germany or Werner-Lehara of Michigan. If the dough rope is of laminate construction having layers of dissimilar material such as that disclosed in commonly-assigned U.S. Pat. No. 4,455,333 to Hong and Brabbs, means 14 is preferably a coextruder such as model number DDP200-3005 available from Bepex-Hutt. Of course, in a high-speed manufacturing setting, several dough ropes are simultaneously formed in parallel rows on top of conveyor belt 18 in which case a common die block includes a corresponding number of individual extrusion or coextrusion dies.

From rope forming means 14, endless conveyor belt 18 carries the rope to the cutting/tamping portion of the apparatus generally indicated as 20, the components and operation of which will be hereinafter described in detail with reference to FIGS. 2-4. Briefly, cutting-/tamping device 20 includes a pair of horizontally reciprocating cutting elements 40 and 42 and vertically reciprocating tamping plate 48 which collectively cooperate in cutting and tamping individual dough pieces 22 from rope 16 as the rope passes therebetween, each piece 22 being of substantially constant predetermined size and shape. As indicated by the arrows, cutting elements 40, 42 and tamping plate 48 are connected to means (not shown) for momentarily moving cutting elements 40, 42 and plate 48 in the same direction and at the same speed as conveyor belt 18, i.e., no relative movement therebetween, when cutting elements 40, 42 and plate 48 engage rope 16.

From cutting/tamping device 20, conveyor belt 18 carries individual dough pieces 22 further downstream for further processing such as, for example, baking dough pieces 22 into individual ready-to-serve cookies. To produce such cookies, dough pieces 22 are preferably transferred to second conveyor belt 24 which travels at a higher speed than conveyor belt 18 in order to adequately space pieces 22 apart from one another to account for the "spreading" that typically takes place when pieces 22 are baked. Higher speed conveyor 24 carries now spaced dough pieces 22 to an oven (not shown) for baking.

In a particularly preferred embodiment of the present invention, means 14 for forming dough rope 16 is provided with a restriction 26 that forms a channel or groove 28 on the top surface of dough rope 16. Other means for forming groove 28 can be used such as pressing into the top surface of rope 16 with a roller, or plowing groove 28 with a stationary plow-shaped instrument.

After dough rope 16 is provided with groove 28, rope 16 passes under morsel dispenser 30 from which a metered amount of discrete morsels 31 are deposited into groove 28. Before dough rope 16 reaches cutting/tamping device 20, dough strip dispenser 32 containing dough 33 under pressure deposits at least one strip of dough 34 on top of discrete morsels 31 which helps secure the morsels in place. Preferably, strip of dough 34 only partially covers discrete morsels 31 in order to increase the visibility of the morsels after a piece of dough is baked. In addition, since it has been found that parallel strips tend to bake out as noticeable stripes on the cookie's upper surface, strip of dough 34 is preferably randomly swirled on top of discrete morsels 31. Random swirling can be accomplished by, for example, mechanically moving nozzle 35 of dough strip dispenser 32, or by exerting sufficient pressure on dough 33 depending on the dough's viscosity to induce turbulent flow thereof.

Figure 2:
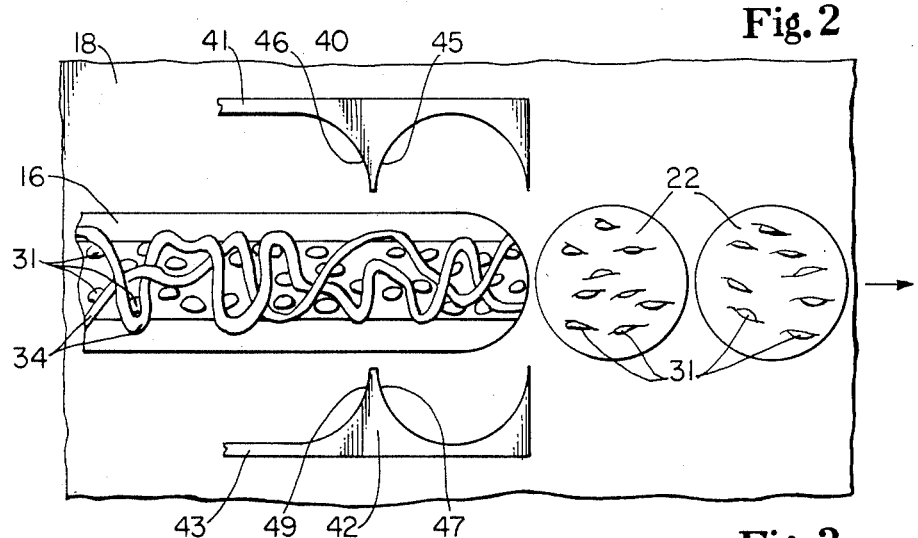
FIG. 2 is an enlarged plan view of the cutting/tamping portion of the apparatus illustrated in FIG. 1 taken along line 2—2 with the pair of cutting elements shown in its open position.
Figure 3:
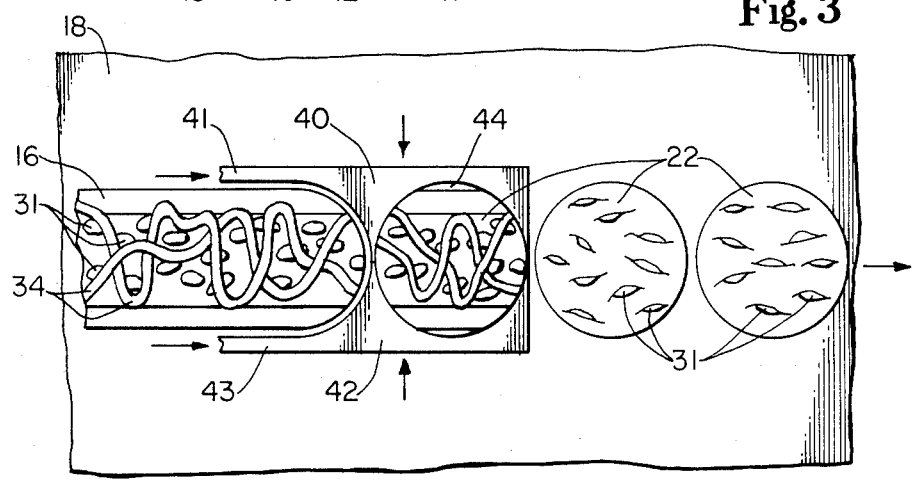
FIG. 3 is an enlarged plan view of the cutting/tamping portion of the apparatus illustrated in FIG. 1 taken along line 2—2 with the pair of cutting elements shown in its closed or cutting position.

Referring now to FIGS. 2 and 3, which are plan views of the cutting/tamping portion 20 of the present apparatus taken along line 2—2 in FIG. 1, dough rope 16 having discrete morsels 31 and randomly swirled strips of dough 34 deposited thereon is shown being carried by conveyor belt 18 past a pair of cutting elements 40 and 42 disposed on opposite sides of dough rope 16. At predetermined intervals that depend primarily on the linear speed at which dough rope 16 travels, cutting elements 40 and 42 are horizontally brought together as shown in FIG. 3, which cuts individual dough piece 22 from the end portion of dough rope 16 and at the same time forms an open-topped mold cavity 44. End portions 41 and 43 of cutting elements 40 and 42, respectively, are connected to means (not shown) such as hydraulic or pneumatic actuators or a rotating cam and follower arrangement for reciprocating elements 40 and 42 in this manner. In addition, end portions 41 and 43 are connected to means (not shown) for horizontally moving cutting elements 40 and 42 in the same direction and speed as conveyor belt 18 when elements 40 and 42 are in their closed or cutting position to avoid tearing or otherwise distorting dough rope 16. After cutting elements 40 and 42 have cut dough piece 22 from the rope, elements 40 and 42 are returned back to their original positions (FIG. 2) in preparation for the next cutting cycle.

As shown in FIGS. 2 and 3, cutting elements 40 and 42 are generally semi-circular in shape which, when closed, results in mold cavity 44 being generally circular in shape. Of course, other shapes such as oval, square, heart-shaped, etc. can be used with equal facility in practicing the present invention. However, if dough rope 16 is of laminate construction comprised of one or more inner doughs within an outer dough, cutting elements 40 and 42 are preferably shaped such that they not only cut dough pieces from the rope, but also smear the outer dough layer over the otherwise exposed inner dough layer to substantially encapsulate or envelop the inner doughs. In the exemplary embodiment illustrated in FIGS. 2 and 3, leading edge 45 and trailing edge 46 of cutting element 40, and leading edge 47 and trailing edge 49 of cutting element 42 are sloped such that these edges smear a small portion of the outer dough material over the inner dough layers when cutting elements 40 and 42 are brought together.

Figure 4:
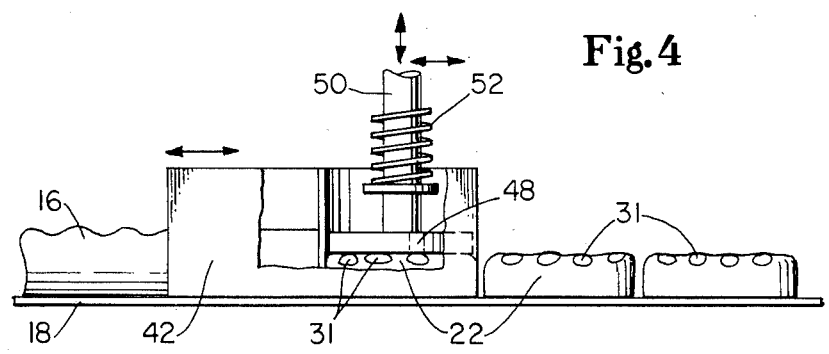
FIG. 4 is an enlarged side elevational view of the cutting/tamping portion of the apparatus illustrated in FIG. 1 shown with a portion of the near cutting element cut away to show the tamping plate in its down position.

Referring to FIG. 4, while cutting elements 40 and 42 are in their closed position and individual dough piece 22 is momentarily trapped within mold cavity 44 as shown in FIG. 3, tamping plate 48, which is shaped complementary to the open top of mold cavity 44, is brought vertically downward such that it enters mold cavity 44 and comes into contact with individual dough piece 22. Tamping dough piece 22 in this fashion serves two purposes; first discrete morsels 31 are firmly pressed into the outer surface of dough piece 22; and second, dough piece 22 is molded into whatever shape mold cavity 44 has. Preferably, shaft 50 connected to tamping plate 48 is spring loaded with spring 52 to keep constant the amount of pressure exerted on dough piece 22. The upper end of shaft 50 is connected to means (not shown) for vertically reciprocating tamping plate 48 in this fashion, e.g., a pneumatic or hydraulic actuator or a cam and follower arrangement. As with cutting elements 40 and 42, tamping plate 48 is preferably connected to means (not shown) for horizontally moving tamping plate 48 in the same direction and speed as conveyor belt 18 when tamping plate 48 is in its down or tamping position.

Depending on the nature and consistency of the dough used in practicing the present invention, it has been found that over time some of the dough tends to stick to the surfaces of cutting elements 40 and 42 and tamping plate 48 that come into contact with the dough. To minimize this dough build-up, it has been found that if the cutting elements are held together for the shortest possible time, i.e., short dwell, the less likely the dough will build-up. Another advantage with short dwells, of course, is that higher production rates are possible.

As shown in FIG. 4, dough rope 16 is of varied cross-section as it enters cutting/tamping device 20 mainly due to the addition of morsels 31 and randomly-swirled dough strips 34. Also, as shown in FIGS. 2 and 3, morsels 31 on the upper surface of dough pieces 22 are firmly pressed into pieces 22 after leaving cutting/tamping device 20 and yet are still readily visible.

While several particularly preferred embodiments of the present invention have been described and illustrated, it should now be apparent to those skilled in the art that various changes and modifications can be made without departing from the spirit and scope of the invention. In addition, although the preceding description of the present invention is generally addressed to making individual pieces of cookie dough, the invention can also be applied with equal facility to a wide variety of edible materials in general. Accordingly, the following claims are intended to embrace such changes, modifications, and areas of application that are within the scope of this invention.

What is claimed is:

1. A method of making individual dough pieces, each piece being of substantially constant predetermined size and shape, said method comprising the steps of:

(a) forming a continuous dough rope and placing said rope onto the top surface of a moving conveyor belt, said rope having an end portion;

(b) cutting a dough piece from said end portion of said rope by horizontally bringing together a pair of cutting elements, said brought together pair of cutting elements defining a mold having an interior cavity and an open top, said dough piece being within said interior cavity of said mold;

(c) tamping said dough piece within said mold cavity by vertically bringing down into contact therewith a tamping plate being shaped complementary to said open top of said mold; and (d) returning said pair of cutting elements and said tamping plate to their original positions, thereby releasing said dough piece of predetermined size and shape from said mold cavity.

2. The method recited in claim 1 further comprising the step of substantially simultaneously with steps (b) and (c), moving said pair of cutting elements and said tamping plate in the same direction and at the same speed as said moving conveyor belt.

3. The method recited in claim 1 wherein said continuous dough rope is formed by extruding said rope from a mass of dough.

4. The method recited in claim 1 wherein said continuous dough rope is of laminate construction comprised of at least two layers of dissimilar dough.

5. The method recited in claim 4 wherein said laminated dough rope is formed by coextruding said rope from at least two dissimilar masses of dough.

6. A method of making individual dough pieces, each piece being of substantially constant predetermined size and shape and containing discrete morsels, said method comprising the steps of:

(a) forming a continuous dough rope and placing said rope onto the top surface of a moving conveyor belt, said rope having an end portion and a top surface having a channel formed therein;

(b) depositing a plurality of said discrete morsels into said channel;

(c) cutting a dough piece from said end portion of said rope by horizontally bringing together a pair of cutting elements, said brought together pair of cutting elements defining a mold having an interior cavity and an open top, said dough piece being within said interior cavity of said mold;

(d) tamping said dough piece within said mold cavity by vertically bringing down into contact therewith a tamping plate being shaped complementary to said open top of said mold; and (e) returning said pair of cutting elements and said tamping plate to their original positions, thereby releasing said dough piece of edible material of predetermined size and shape from said mold cavity.

7. The method recited in claim 6 further comprising the step of before step (c), depositing at least one strip of dough over said plurality of discrete morsels deposited in said channel on said rope.

8. The method recited in claim 6 or 7 further comprising the step of substantially simultaneously with steps (c) and (d), moving said pair of cutting elements and said tamping plate in the same direction and at the same speed as said moving conveyor belt.

9. The method recited in claim 6 wherein said continuous dough rope is formed by extruding said rope from a mass of dough.

10. The method recited in claim 6 wherein said continuous dough rope is of laminate construction comprised of at least two layers of dissimilar dough.

11. The method recited in claim 10 wherein said laminated dough rope is formed by coextruding said rope from at least two dissimilar masses of dough.

12. The method recited in claims 6 wherein said discrete morsels are selected from the group consisting of flavored chips, nutmeats, fruits, cereals, candies, and mixtures thereof.

13. The method recited in claims 1 or 6 further comprising the steps of transferring said dough pieces to an oven, and baking said dough pieces.

14. An apparatus for making individual dough pieces, each piece being of substantially constant predetermined size and shape, said apparatus comprising:

(a) means for forming a continuous dough rope on the top surface of a horizontally-moveable conveyor belt, said rope having an end portion;

(b) a pair of horizontally-moveable cutting elements disposed on opposed sides of said continuous dough rope, said pair of cutting elements having an open position and a closed position, said pair of cutting elements in its closed position defining a mold having an open top;

(c) means for reciprocally moving said pair of cutting elements from its said open position to its said closed position in a direction substantially perpendicular to the longitudinal axis of said conveyor belt, thereby cutting a dough piece from said end portion of said rope;

(d) a vertically-moveable tamping plate disposed above said pair of cutting elements, said tamping plate having an up position and a down position and being shaped complementary to said open top of said mold; and (e) means for reciprocally moving said tamping plate from its up position to its down position, said tamping plate in its down position entering said open top of said mold and coming into contact with said dough piece, thereby giving said dough piece said predetermined size and shape.

15. An apparatus for making individual dough pieces, each piece being of substantially constant predetermined size and shape and containing discrete morsels, said apparatus comprising;

(a) means for forming a continuous dough rope on the top surface of a horizontally-moveable conveyor belt, said rope having an end portion and a top surface having a channel formed therein;

(b) means for depositing a plurality of said discrete morsels into said channel;

(c) a pair of horizontally-moveable cutting elements disposed on opposed sides of said continuous rope, said pair of cutters having an open position and a closed position, said pair of cutters in its closed position defining a mold having an open top;

(d) means for reciprocally moving said pair of cutters its said open position to its said closed position in a direction substantially perpendicular to the longitudinal axis of said conveyor belt, thereby cutting a discrete piece of edible material from said end portion of said rope;

(e) a vertically-moveable tamper plate disposed above said pair of cutters, said tamper plate having an up position and a down position and being shaped complementary to said open top of said mold; and (f) means for reciprocally moving said tamping plate from its up position to its said down position, said tamping plate in its down position entering said open top of said mold and coming into contact with said dough piece, thereby giving said dough piece said predetermined size and shape.

16. The apparatus recited in claim 15 further comprising means for depositing at least one strip of dough over said plurality of morsels deposited in said channel on said rope.

17. The apparatus recited in claim 14 or 15 wherein said means for forming said continuous dough rope comprises an extruder.

18. The apparatus recited in claim 14 or 15 wherein said continuous dough rope is of laminate construction comprised of at least two layers of dissimilar dough and wherein said means for forming said continuous rope comprises a coextruder.

19. The apparatus recited in claim 14 or 15 further comprising an oven, and means for transferring said individual dough pieces to said oven.

20. The apparatus recited in claim 14 or 15 further comprising means for moving said pair of cutting elements and said tamping plate in the same direction and at the same speed as said moving conveyor belt when said pair of cutting elements is in its said closed position and when said tamping plate is in its said down position.

* * * * *

UNITED STATES PATENT AND TRADEMARK OFFICE
CERTIFICATE OF CORRECTION

PATENT NO. : 4,741,916

DATED : May 3, 1988

INVENTOR(S) : Daniel J. Heidel and Corey J. Kenneally

It is certified that error appears in the above-identified patent and that said Letters Patent is hereby corrected as shown below:

Title page, line 7 of ABSTRACT, "form" should read -- from --.

Column 1, line 28, "revolutinary" should read -- revolutionary --.

Column 1, line 51, "scrapped" should read -- scraped --.

Column 6, line 18, insert "," after "first".

Column 8, line 7, Claim 12, "claims" should read -- claim --.

Column 8, line 46, Claim 15, ";" should read -- : --.

Column 8, line 58, Claim 15, after "cutters" insert -- from --.

Signed and Sealed this

Thirteenth Day of September, 1988

*Attest:*

DONALD J. QUIGG

*Attesting Officer*  *Commissioner of Patents and Trademarks*